US005393614A

United States Patent [19]

Nakada

[11] Patent Number: 5,393,614

[45] Date of Patent: Feb. 28, 1995

[54] ORGANIC ELECTROLUMINESCENCE DEVICE

[75] Inventor: Hitoshi Nakada, Tsurugashima, Japan

[73] Assignee: Pioneer Electronic Corporation, Tokyo, Japan

[21] Appl. No.: 37,454

[22] Filed: Mar. 26, 1993

[30] Foreign Application Priority Data

Apr. 3, 1992 [JP] Japan ................................. 4-082197
Nov. 24, 1992 [JP] Japan ................................. 4-313618

[51] Int. Cl.$^6$ ................................................ B32B 9/00

[52] U.S. Cl. .................................... 428/690; 428/917; 428/411.1; 428/457; 313/504; 313/506

[58] Field of Search ..................... 428/411.1, 457, 690, 428/917; 546/49, 88; 430/58, 59; 313/504, 506

[56] References Cited

U.S. PATENT DOCUMENTS 3,654,525 4/1972 Maricle et al. ...................... 317/230
3,812,123 5/1974 Otterstedt et al. ..................... 546/88
5,077,142 12/1991 Sakon et al. ......................... 428/690
5,085,947 2/1992 Saito et al. .......................... 428/690
5,128,587 7/1992 Skotheim et al. ...................... 313/504
5,281,489 1/1994 Mori et al. .......................... 428/690

*Primary Examiner*—Patrick J. Ryan
*Assistant Examiner*—Marie R. Macholl
*Attorney, Agent, or Firm*—Sughrue, Mion, Zinn, Macpeak & Seas

[57] ABSTRACT

An organic Electroluminescence device comprises an electron hole transport layer, an organic emitting layer and an organic hole transport layer laminated in sequence and arranged between the cathode and the anode, in characterized in that the electron transport layer made of 1,10- or 1,7- or 4,7-phenanthroline derivative or 5,6 -dihydro-dibenzo[bj]phenanthroline derivative. This Electroluminescence device is capable of improving the durability and to emit blue light at a high luminance and a high efficiency upon application of a low voltage.

8 Claims, 2 Drawing Sheets

ORGANIC ELECTROLUMINESCENCE DEVICE

BACKGROUND OF THE INVENTION

1. Field of the Invention

The present invention relates to an electroluminescence (EL) device having an emitting layer made of an emitting substance, which utilizes an electroluminescence phenomenon that the emitting substance emits light by applying an electric current to the emitting layer. More particularly, it is concerned with an organic EL device in which the emitting layer is made of an organic emitting substance.

2. Description of the Prior Art

As organic EL devices, there have been known an device of two-layer structure having two layers of organic compounds as shown in FIG. 1, in which an organic fluorescent thin film 3 (hereinafter referred as "emitting layer") and an organic hole transport layer 4 are laminated with each other and are arranged between a metal cathode 1 and a transparent anode 2. There have been also known an device of three-layer structure having three layers of organic compounds as shown in FIG. 2, in which an organic electron transport layer 5, an emitting layer and an organic hole transport layer 4 are laminated in sequence and are sandwiched as a whole between a metal cathode 1 and a transparent anode, 2. The hole transport layer 4 facilitates the infusion of the holes from the anode and blocks electrons. The electron transport layer 5 facilitates the infusion of electrons from the cathode.

In these organic EL devices, a glass substrate 6 is furnished outside the transparent anode 2. The recombination of electrons infused from the metal cathode 1 and the holes infused from the transparent anode 2 to the emitting layer 3 generates excitons. The excitons emit light when they are deactivated through radiation. This light radiates toward outside through the transparent anode 2 and the glass substrate 6.

Such aforementioned organic EL device can emit light even by application of a lower voltage. It is however expected to develop an EL device capable of emission at a further high luminance efficiency.

SUMMARY OF THE INVENTION

An object of the present invention is to provide an organic EL device capable of stably emitting light at a high luminance and a high efficiency to satisfy the above mentioned expectation.

An organic EL device according to a first aspect of the present invention comprises an anode, a hole transport layer of organic compound, an emitting layer of organic compound, an electron transport layer of organic compound and a cathode, which are laminated in sequence, wherein said electron transport layer is made of a 1,10-phenanthroline derivative represented by the following chemical formula (1a)

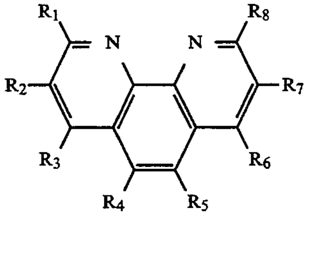

(1a)

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

An organic EL device according to a second aspect of the present invention comprises an anode, a hole transport layer of organic compound, an emitting layer of organic compound, an electron transport layer of organic compound and a cathode, which are laminated in sequence, wherein said electron transport layer is made of a 1,7-phenanthroline derivative represented by the following chemical formula (1b)

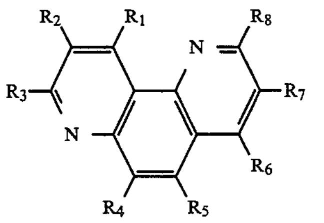

(1b)

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

An organic EL device according to a third aspect of the present invention comprises an anode, a hole transport layer of organic compound, an emitting layer of organic compound, an electron transport layer of organic compound and a cathode, which are laminated in sequence, wherein said electron transport layer is made of a 4,7-phenanthroline derivative represented by the following chemical formula (1c)

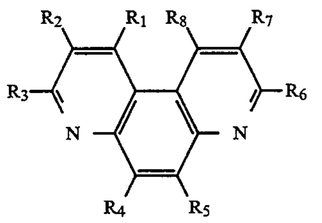

(1c)

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

An organic EL device according to a fourth aspect of the present invention comprises an anode, a hole transport layer of organic compound, an emitting layer of organic compound, an electron transport layer of organic compound and a cathode, which are laminated in sequence, wherein said electron transport layer is made of a phenanthroline derivative of 5,6-dihydro-dibenzo[bj]phenanthroline represented by the following chemical formula (1d)

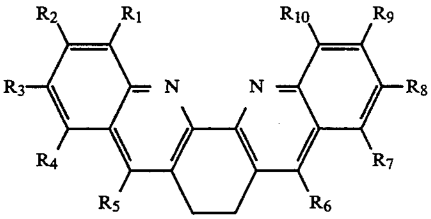

(1d)

where $R_1$–$R_{10}$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

According to the present invention, there is obtained an organic EL device capable of stably emitting light at a high luminance and a high efficiency with the durability.

DETAILED DESCRIPTION OF PREFERRED EMBODIMENTS

The embodiments according to the present invention will be described in more detail with reference to the accompanying drawings.

Figure 1:
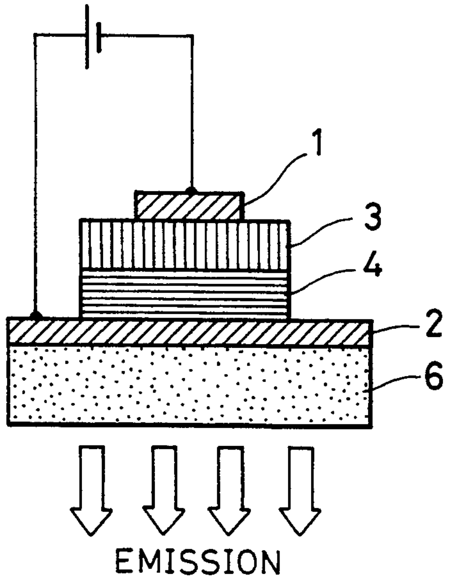
FIG. 1 is a schematic diagram showing an organic EL device with two-layer structure.
Figure 2:
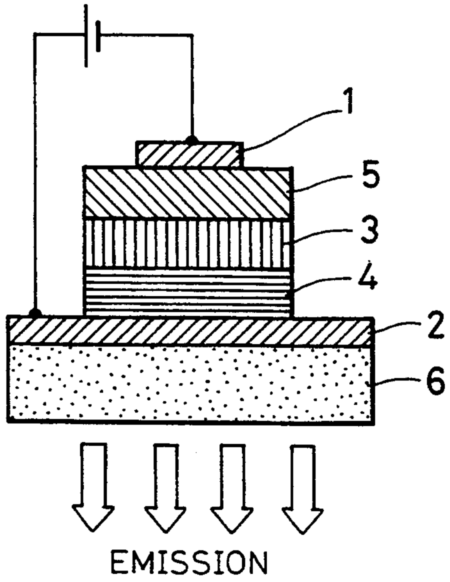
FIG. 2 is a schematic diagram showing an organic EL device with three-layer structure.

The EL device in accordance with the present invention is similar to the organic EL device of the structure shown in FIG. 2. Such an EL device has the three-layer structure formed by layering an organic electron transport layer 5, the organic fluorescent film 3 and the organic positive-hole transport layer 4 in sequence between a pair of the metal cathode 1 and the transparent anode 2. In this structure of the EL device, at least one of the electrodes 1 and 2 may be transparent. The cathode 1 is formed of a metal with a lower work function such as aluminum, magnesium, indium, silver or alloys of the individual metals thereof in the thickness range of from about 100 to 5000 angstroms. The transparent anode 2 is formed of an electric conductive material with a higher work function such as indium-tin oxide (ITO) in the thickness range of from about 1000 to 3000 angstroms. Alternatively, the transparent anode 2 may be formed of gold with the thickness of from about 800 to 1500 angstroms. The electrode of gold thin film is semitransparent.

The hole transport layer 4 of FIG. 2 is made of a triphenylamine derivative represented by the following formula (2). The organic hole transport layer 4 may also be made of a carrier transmitting material (CTM) represented by the following formulas (3) to (13).

(2)

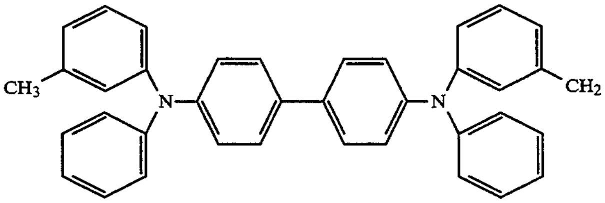

(3)

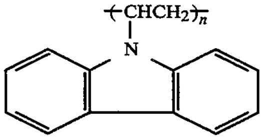

(n = integer)

(4)

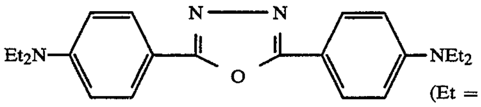

(Et = $C_2H_5$)

(5)

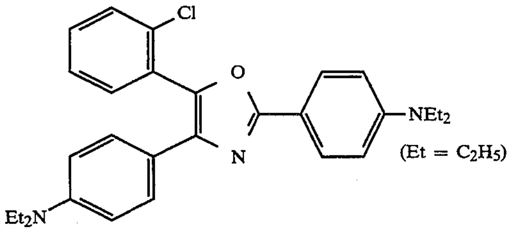

(Et = $C_2H_5$)

-continued
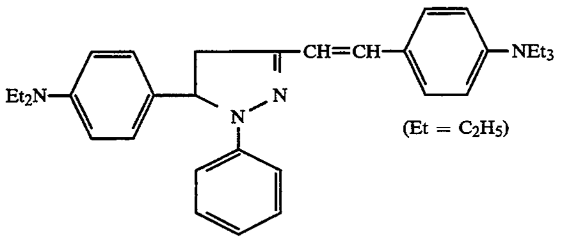
(6)
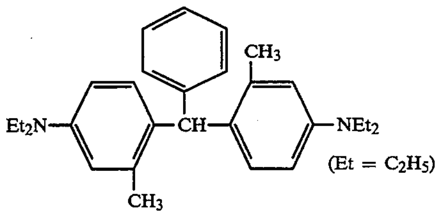
(7)
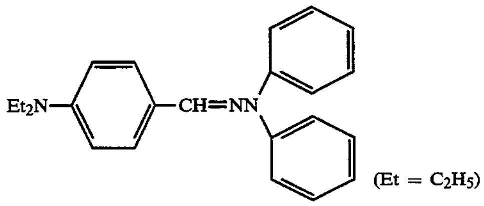
(8)
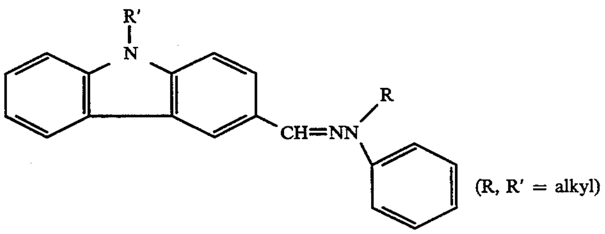
(9)
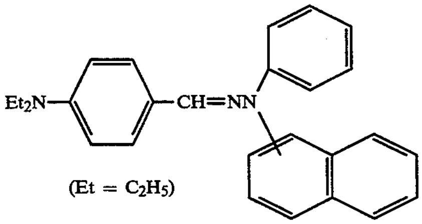
(10)
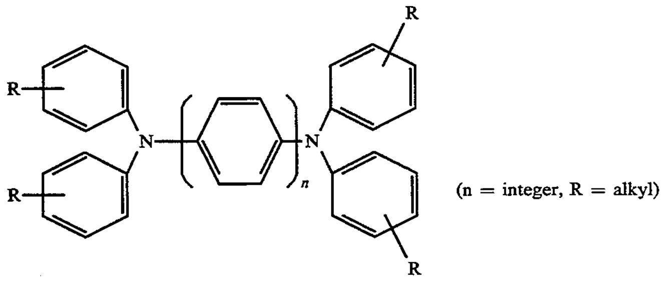
(11)

-continued (12)

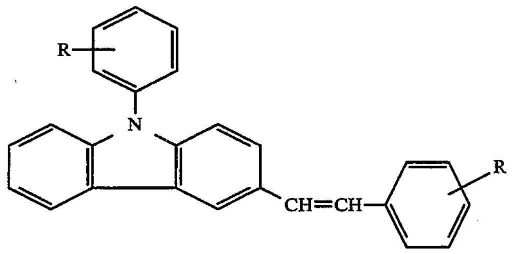

(R = alkyl)

(13)

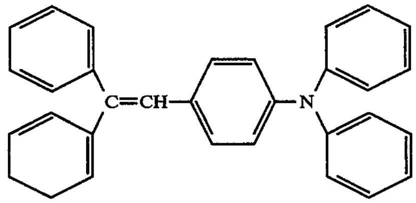

The emitting layer 3 of the organic EL device comprises the organic fluorescent compound. Preferred examples of the compound are tetraphenylbutadiene (TPB) derivatives respectively represented by the following chemical formulas 14 to 16 and 16a.

(14)

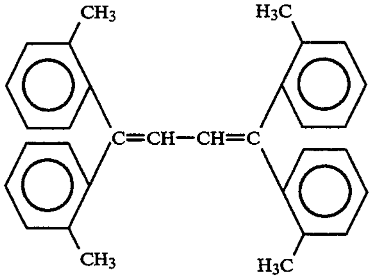

(15)

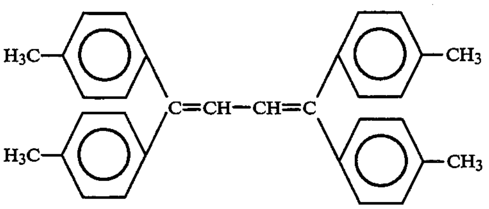

-continued (16)

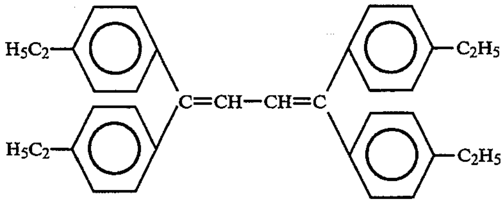

(16a)

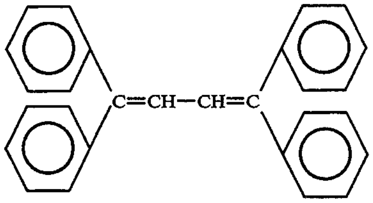

In addition, other preferred examples used for the emitting layer 3 are represented by the following formulas 17 to 25. The emitting layer 3 may include another fluorescent compound as a guest material. The thickness of the emitting layer 3 is within 1 micron or less.

(17)

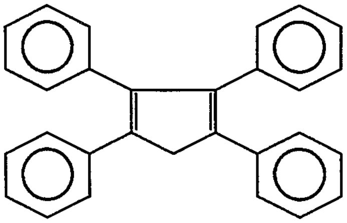

(18)

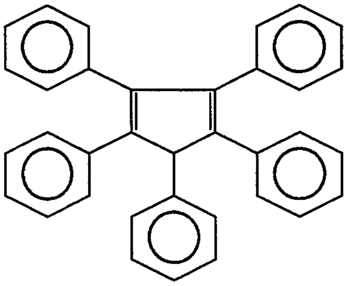

-continued (19)

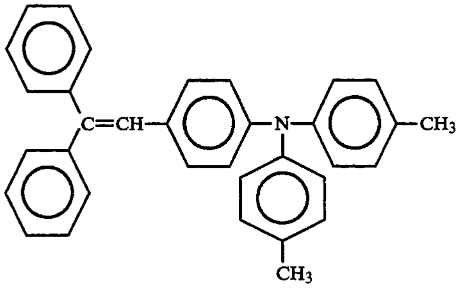

(20)

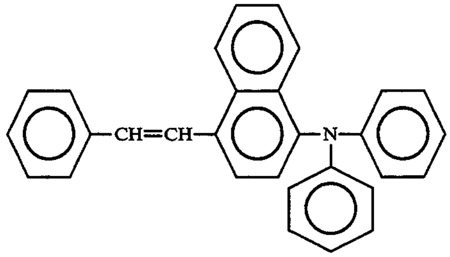

(21)

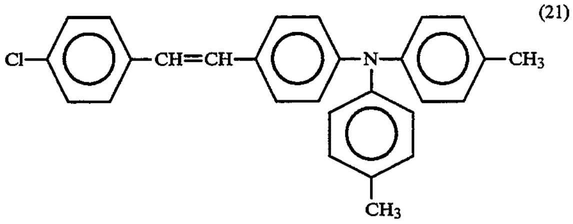

(22)

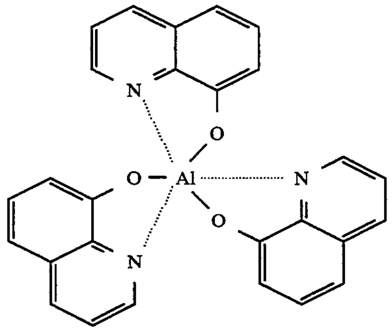

(23)

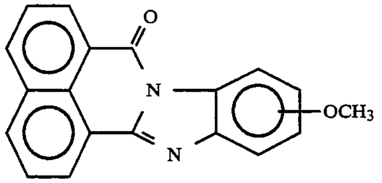

(24)

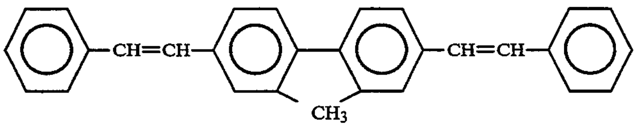

(25)

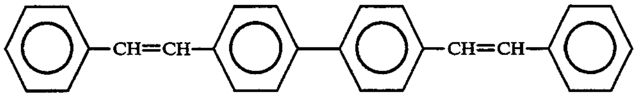

The electron transport layer 5 is preferably made of a phenanthroline derivative generally represented by the following chemical formula (1a) of 1,10-phenanthroline.

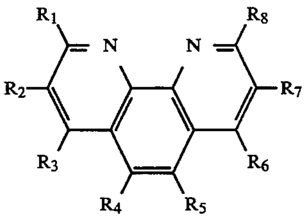

(1a)

where $R_1$-$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

Preferred examples of 1,10-phenanthroline derivatives which may be employed as the electron transport layer 5 are represented by the following chemical formulas 26 to 82.

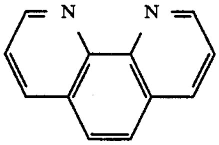
(26)
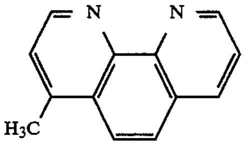
(27)
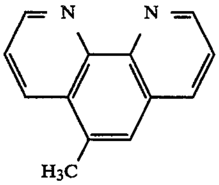
(28)
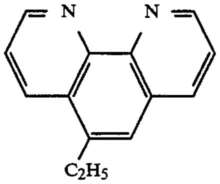
(29)
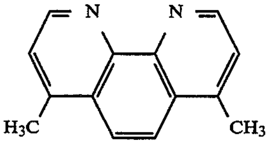
(30)
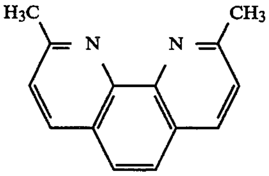
(31)
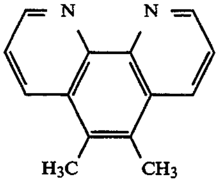
(32)
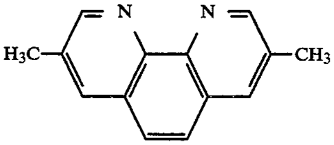
(33)
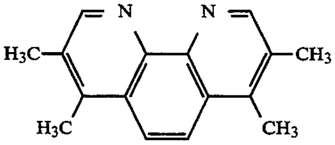
(34)
-continued
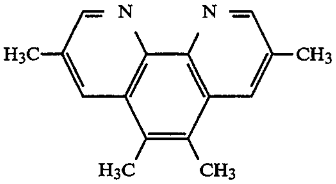
(35)
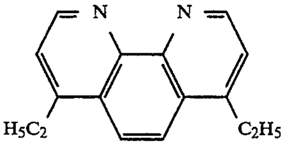
(36)
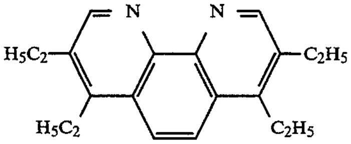
(37)
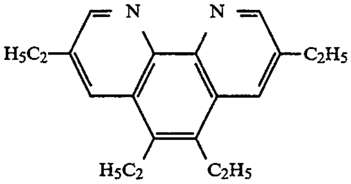
(38)
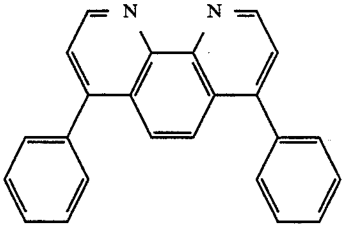
(39)
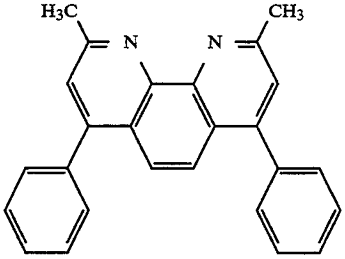
(40)
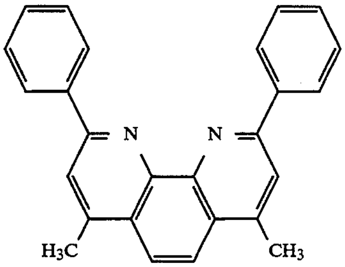
(41)

-continued
(42)
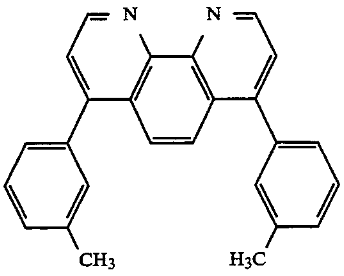
(43)
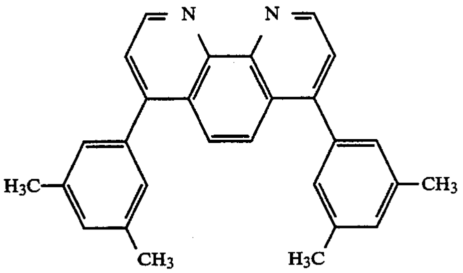
(44)
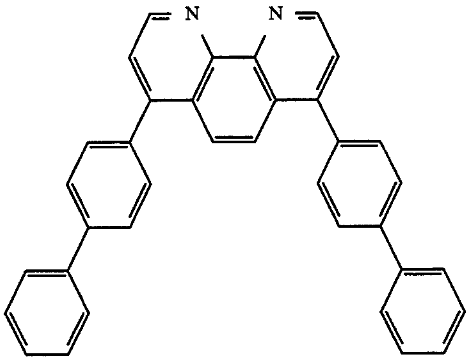
(45)
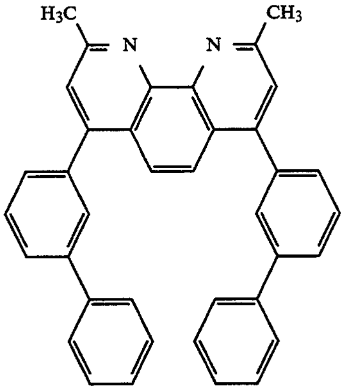
(46)
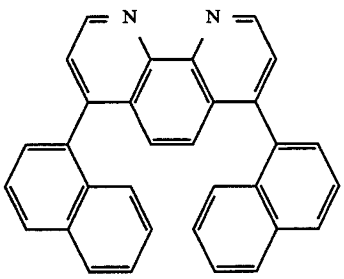
-continued
(47)
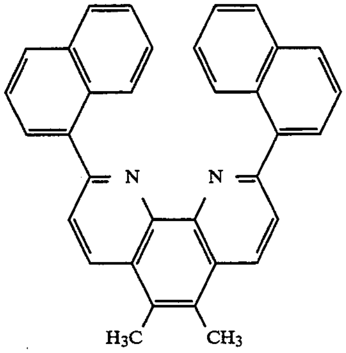
(48)
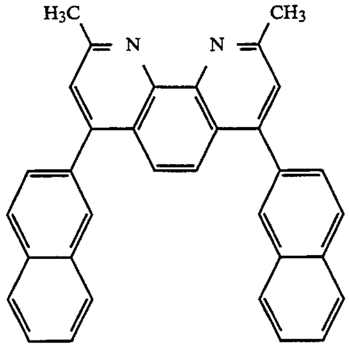
(49)
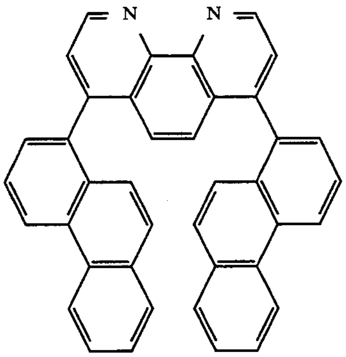
(50)
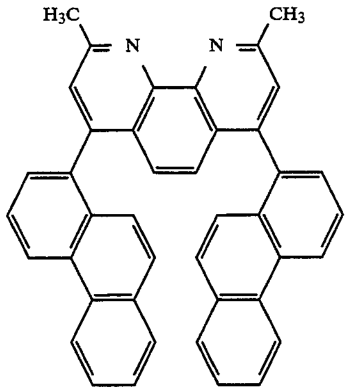

-continued
(51)
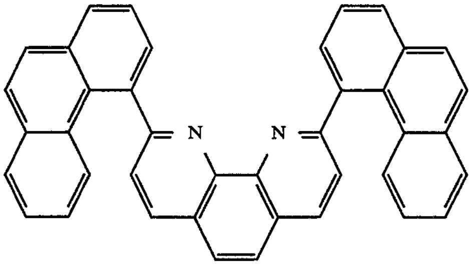
(52)
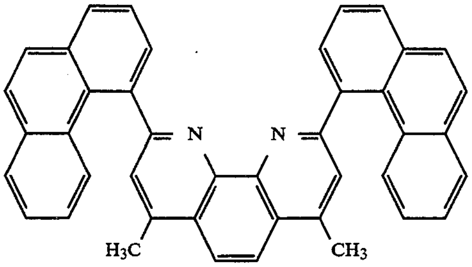
(53)
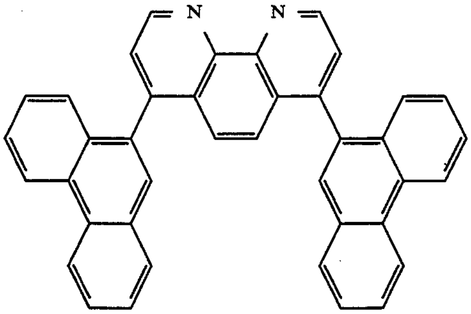
(54)
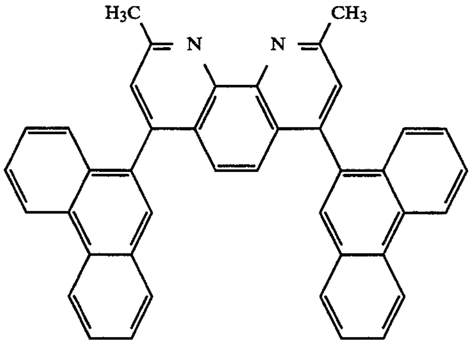
(55)
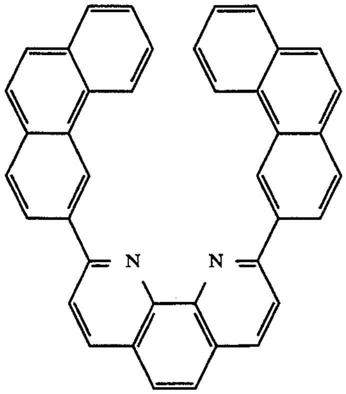
-continued
(56)
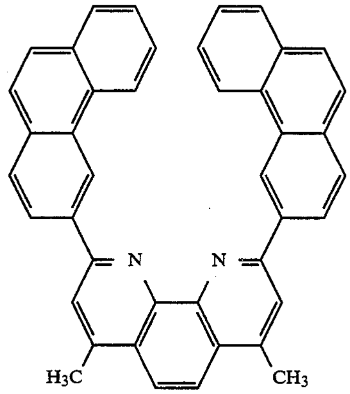
(57)
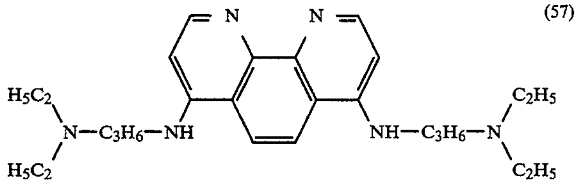
(58)
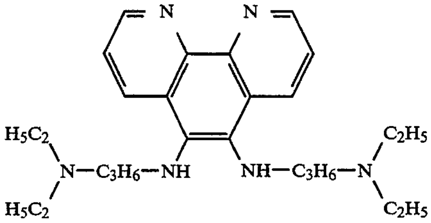
(59)
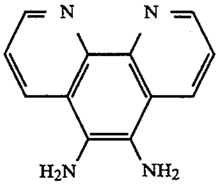
(60)
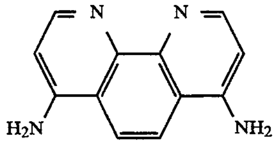
(61)
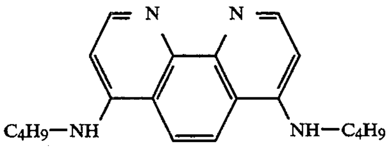
(62)
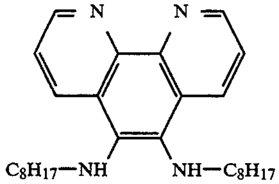

-continued
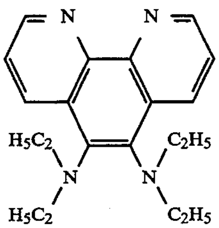
(63)
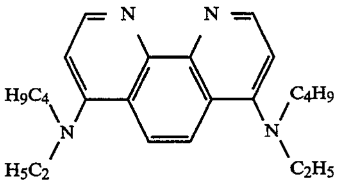
(64)
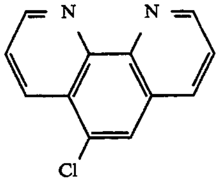
(65)
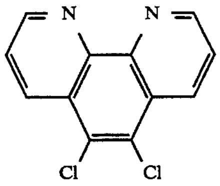
(66)
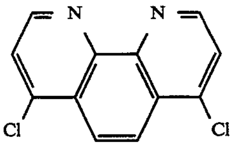
(67)
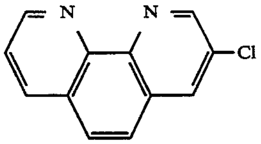
(68)
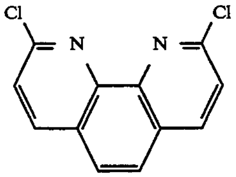
(69)
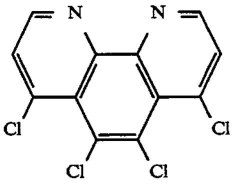
(70)
-continued
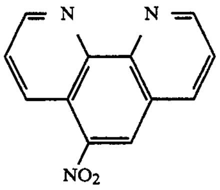
(71)
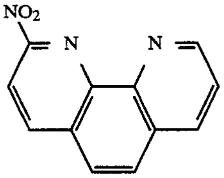
(72)
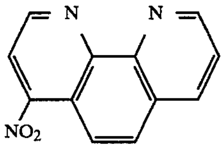
(73)
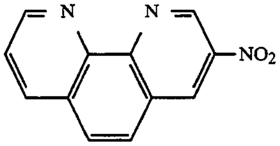
(74)
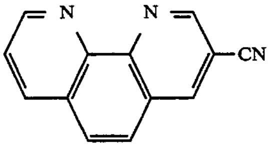
(75)
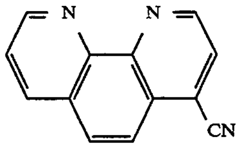
(76)
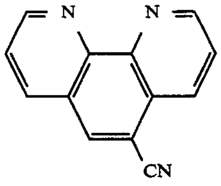
(77)
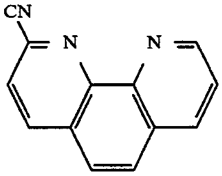
(78)
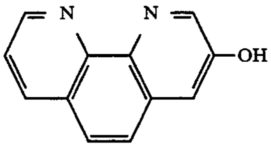
(79)

-continued

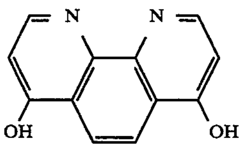

(80)

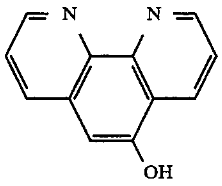

(81)

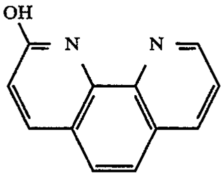

(82)

In addition, other preferred examples used for the electron transport layer 5 are 1,7-phenanthroline derivative represented by the following formula (1b) and 4,7-phenanthroline derivatives: represented by the following formula (1c) .

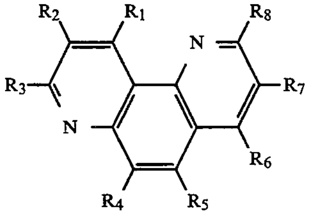

(1b)

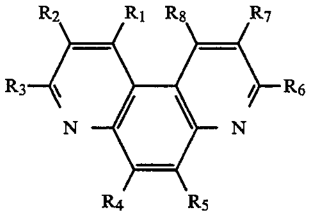

(1c)

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

Furthermore, another preferred example used for the electron transport layer 5 is made of a phenanthroline derivative of 5,6-dihydro-dibenzo[bj]phenanthroline represented by the following chemical formula (1d):

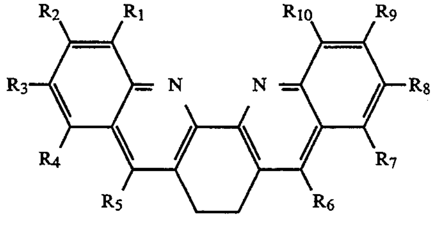

(1d)

where $R_1$–$R_{10}$ independently represent a hydrogen atom, a substituted or unsubstituted alkyl, group, a substituted or unsubstituted aryl group, a substituted or unsubstituted amino group, a halogen atom, a nitro group, a cyano group or a hydroxyl group. Preferred examples of dihydro-dibenzo-phenanthroline derivatives represented by the following chemical formulas (88)–(91). The present invention is not restricted with these examples mentioned above.

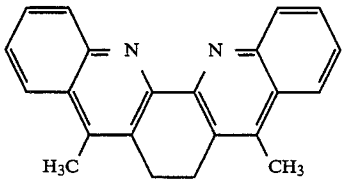

(88)

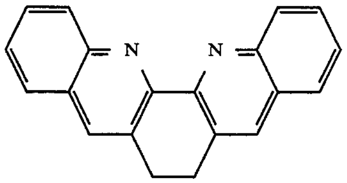

(89)

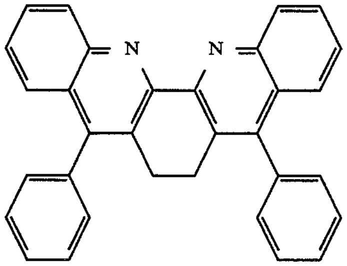

(90)

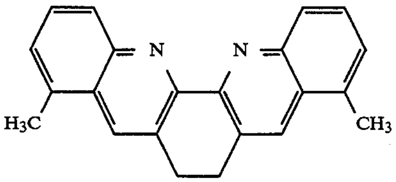

(91)

EXAMPLE 1

A glass substrate on which an anode of ITO had been formed at 1500 Å thick, was prepared. The substrate was washed by ultrasonic wave for 5 minutes in ethanol. After the substrate were dried, the triphenylamine derivative denoted by formula (2) was deposited on the ITO anode at the vacuum deposition rate of 3 Å/sec by using a tantalum boat carrying the derivative to be a hole transport layer with the thickness of 500 Å. Each of this film and the following were formed by a vacuum deposition method at vacuum conditions equal to or less than $1.0 \times 10^{-6}$ Torr.

Next, the tetraphenylbutadiene derivative of emitting substance denoted by formula (15) was deposited on the hole transport layer at the vacuum deposition rate of 4 Å/sec to be an emitting layer with the thickness of 200 Å.

Next, the 1,10-phenanthroline derivative denoted by formula (39) was deposited on the emitting layer at the vacuum deposition rate of 3 Å/sec to be an electron transport layer with the thickness of 500 Å.

Then, the magnesium and silver alloy was vacuum co-deposited on the electron transport layer in such a manner that magnesium was deposited at the deposition rate of 10 Å/sec simultaneously silver deposited at the deposition rate of 1 Å/sec to be a cathode with the thickness of 1500 Å.

When the resultant EL device was operated with the application of the DC voltage 5 V between the ITO anode and the Mg—Ag cathode, the emission of this EL device was luminance of 25 cd/m$^2$ of blue light. The luminance efficiency was 0.7 lm/W.

EXAMPLE 2

An EL device was assembled by the same procedure as in Example 1, except that the electron transport layer was made of another 1,10-phenanthroline derivative represented by formula (40) instead of the derivative used in Example 1.

When the resultant EL device was operated with the application of the DC voltage 12 V,between the ITO anode and the Mg—Ag cathode, the emission of this EL device was luminance of 47 cd/m$^2$ of blue light. The luminance efficiency was 0.3 lm/W.

EXAMPLE 3

An EL device was assembled by the same procedure as in Example 1, except that the emitting layer was made of another tetraphenylbutadiene derivative represented by formula (14) instead of the emitting substance used in Example 1.

When the resultant EL device was operated with the application of the DC voltage 7 V between the ITO anode and the Mg—Ag cathode, the emission of this EL device was luminance of 72 cd/m$^2$ of blue light. The luminance efficiency was 0.4 lm/W.

EXAMPLE 4

An EL device was assembled by the same procedure as in Example 1, except that the emitting layer was made of 1,1,4,4-tetraphenyl-1,3-butadiene represented by formula (16a) instead of the emitting substance used in Example 1.

When the resultant EL device was operated with the application of the DC voltage 6 V between the ITO anode and the Mg—Ag cathode, the emission of this EL device was luminance of 63 cd/m$^2$ of blue light. The luminance efficiency was 1.5 lm/W. When the,resultant EL device was further operated with the application of the DC voltage 13 V, the emission of this EL device was luminance of 5800 cd/m$^2$ of blue light.

EXAMPLE 5

An EL device was assembled by the same procedure as in Example 4, except that the cathode with the thickness of 800 Å was made of aluminum and lithium alloy at the Li concentration 0.2 wt. % in such a manner that the alloy was vacuum co-deposited on the electron transport layer at the deposition rate of 10 Å/sec. instead of the cathode substance used in Example 4.

When the resultant EL device was operated with the application of the DC voltage 5 V between the ITO anode and the Al—Li cathode, the emission of this EL device was luminance of 82 cd/m$^2$ of blue light. The luminance efficiency was 2.4 lm/W. When the resultant EL device was further operated with the application of the DC voltage 12 V, the emission of this EL device was luminance of 9700 cd/m$^2$ of blue light.

Comparative example 1

An EL device was assembled by the same procedure as in Example 1, except that the electron transport layer was not formed between the emitting layer and the cathode.

When the resultant EL device was operated with the application of the DC voltage 12 V between the ITO anode and the Mg—Ag cathode, the emission of this EL device was luminance of 24 cd/m$^2$ of blue light. The luminance efficiency was 0.02 lm/W which was one figure less than that of Example 1.

EXAMPLE 6

An EL device was assembled by the same procedure as in Example 4. When the resultant EL device was kept by the constant-current application to emit light with luminance of 82 cd/m$^2$ at the same conditions of Example 1, the half-life of the initial luminance of this EL device was 4 hours and 45 minutes under a vacuum state.

Comparative example 2

An EL device was assembled by the same procedure as in Example 4, except that the electron transport layer 5 was made of 2-(4'-tert-butylphenyl)-5-(4''-biphenyl)-1,3,4-oxadiazole (so called t-Bu-PBD which is well known as one of superior electron transport materials) denoted by the following chemical formula (86) instead of the electron transport material used in the Example 4.

(86)

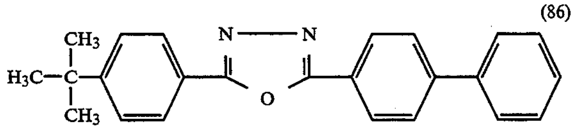

When the resultant EL device was operated with the application of the DC voltage 7 V between the ITO anode and the Mg—Ag cathode, the emission of this EL device was luminance of 29 cd/m$^2$ of blue light. The luminance efficiency was 1.4 lm/W. When the resultant EL device was further operated with the application of the DC voltage 13 V, the emission of this EL device was luminance of 1300 cd/m$^2$. The maximum luminance of Comparative 2 was about $\frac{1}{4}$ lower than that of Example 4.

Figure 3:
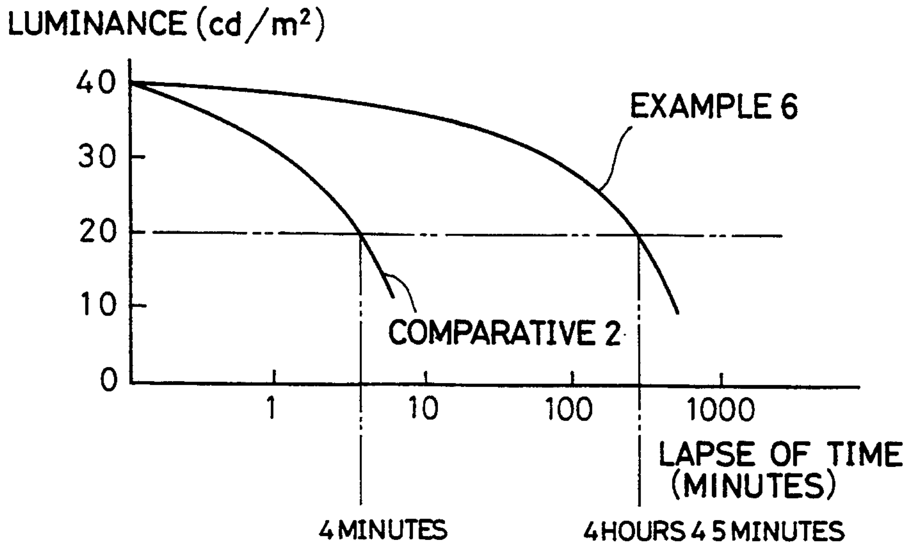
FIG. 3 is a graph showing luminance changes in the lapse of time with respect to organic EL devices of both Example 6 and Comparative 2.

When the resultant EL device was kept by the constant-current application to emit light with luminance of 40 cd/m$^2$, the half life of the initial luminance of this EL device was 4 minutes under a vacuum state, which was far less than that of Example 6 as shown in FIG. 3.

EXAMPLE 7

An EL device was assembled by the same procedure as in Example 4, except that the electron transport layer was made of another 1,10-phenanthroline derivative represented by formula (40) instead of the derivative used in Example 4.

When the resultant EL device was kept by the constant-current application to emit light with luminance of 200 cd/m$^2$, the half-life of the initial luminance of this EL device was 4 hours and 45 minutes under a vacuum state. When the initial luminance of 40 cd/m$^2$ was kept, the half-life of the initial luminance of this EL device was 35 hours. When the initial luminance of 10 cd/m$^2$ was kept, the half-life of the initial luminance of this EL device was 100 hours. The half-life of the initial luminance of this EL device was greatly expanded in comparison with that of Comparative Example 2.

EXAMPLE 8

An EL device was assembled by the same procedure as in Example 4, except that the electron transport layer was made of 5,6-dihydro-dibenzo[bj]phenanthroline derivative represented by formula (88) instead of the electron transport material used in Example 1.

When the resultant EL device was kept by the constant-current application to emit light with luminance of 40 cd/m$^2$, the half-life of the initial luminance of this EL device was 33 hour, which was greatly expanded in comparison with that of Comparative Example 2.

As described above, the organic EL device according to the present invention comprises the electron hole transport layer, the organic emitting layer and the organic hole transport layer laminated in sequence and arranged between the cathode and the anode, in characterized in that the electron transport layer made of 1,10- or 1,7- or 4,7-phenanthroline derivative or 5,6-dihydro-dibenzo[bj]phenanthroline derivative. The organic EL device according to the present invention is capable of improving the durability and to emit blue light at a high luminance and a high efficiency upon application of a low voltage.

What is claimed is:

1. An organic electroluminescence device having a three-layer structure comprising an anode, a hole transport layer of an organic compound, an emitting layer of an organic compound, an electron transport layer of an organic compound and a cathode, which are laminated in sequence, wherein said electron transport layer is made of a 1,10-phenanthroline derivative represented by the following chemical formula

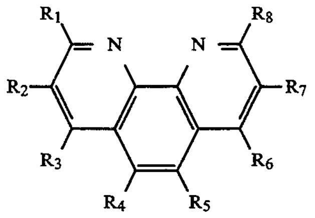

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

2. An organic electroluminescence device having a three-layer structure comprising an anode, a hole transport layer of an organic compound, an emitting layer of an organic compound, an electron transport layer of an organic compound and a cathode, which are laminated in sequence, wherein said electron transport layer is made of a 1,7-phenanthroline derivative represented by the following chemical formula

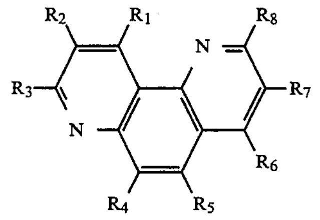

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

3. An organic electroluminescence device having a three-layer structure comprising an anode, a hole transport layer of an organic compound, an emitting layer of an organic compound, an electron transport layer of an organic compound and a cathode, which are laminated in sequence, wherein said electron transport layer is made of a 4,7-phenanthroline derivative represented by the following chemical formula

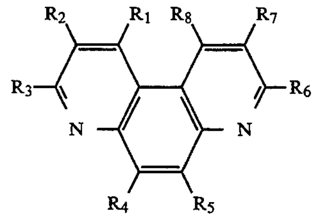

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

4. An organic device having a three-layer structure comprising an anode, a hole transport layer of an organic compound, an emitting layer of an organic compound, and an electron transport layer of an organic compound, and a cathode, which are laminated in sequence, wherein said electron transport layer is made of a phenanthroline derivative of 5,6-dihydro-dibenzo[bj]-phenanthroline, represented by the following chemical formula:

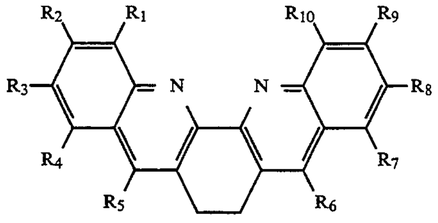

where $R_1$–$R_8$ independently represent a hydrogen atom, a substituted or unsubstituted alkyl group, a substituted or unsubstituted aryl group, a substituted or unsubstituted amino group, a halogen atom, a nitro group, a cyano group or a hydroxyl group.

5. An organic electroluminescence device as claimed in claim 1, wherein said emitting layer is made of a compound selected from tetraphenylbutadiene derivatives represented by the chemical formula (14), (15), (16) or (16a):

(14)

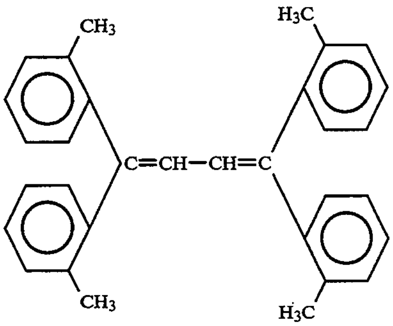

(15)

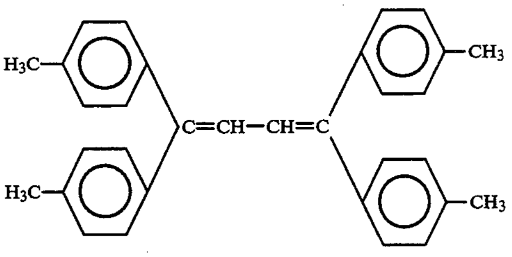

(16)

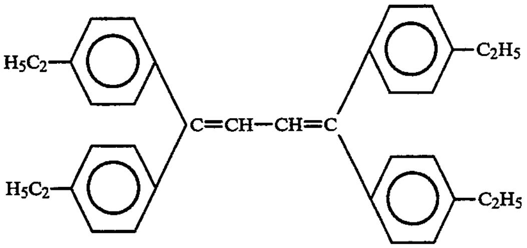

and (16a)

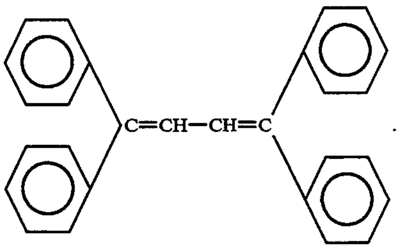

6. An organic electroluminescence device as claimed in claim 2, wherein said emitting layer is made of a compound selected from tetraphenylbutadiene derivatives represented by chemical formula (14), (15), (16) or (16a):

(14)

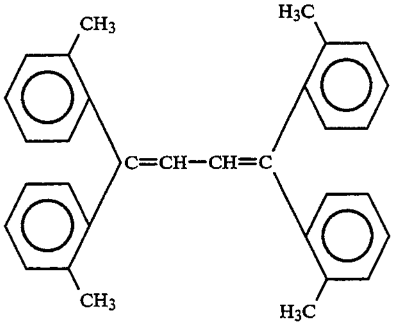

(15)

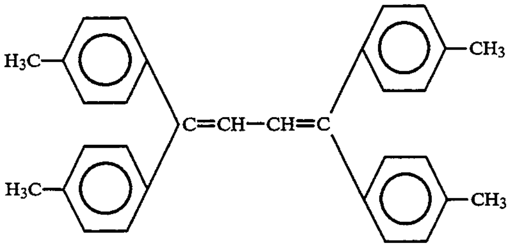

(16)

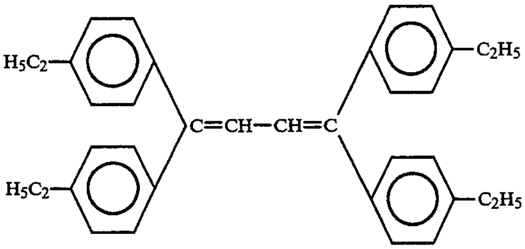

and (16a)

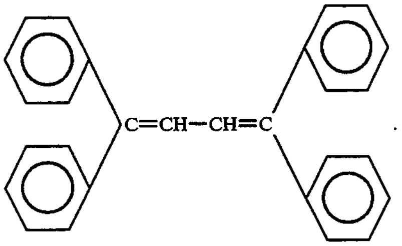

7. An organic electroluminescence device as claimed in claim 3, wherein said emitting layer is made of a compound selected from tetraphenylbutadiene derivatives represented by chemical formula (14), (15), (16) or (16a):

(14)

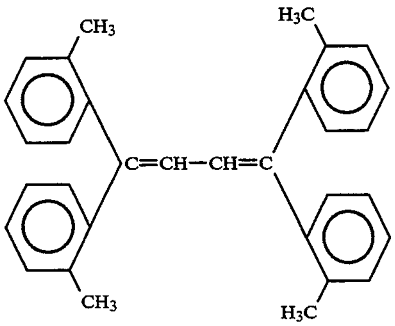

-continued
(15)
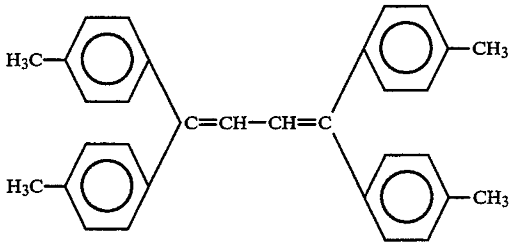
(16)
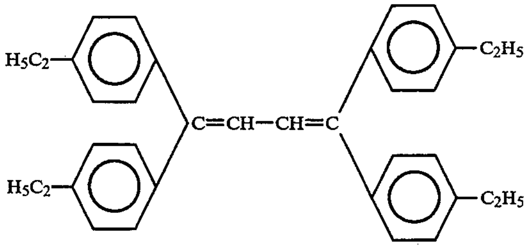
and
(16a)
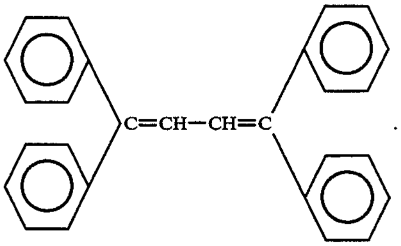
8. An organic electroluminescence device as claimed in claim 4, wherein said emitting layer is made of a compound selected from tetraphenylbutadiene derivatives represented by chemical formula (14), (15), (16) or (16a):
(14)
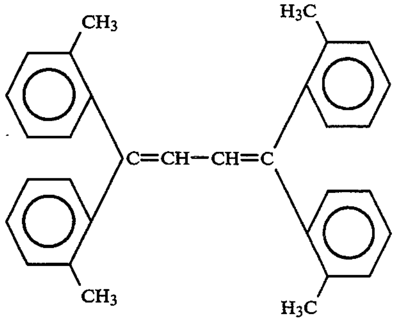
(15)
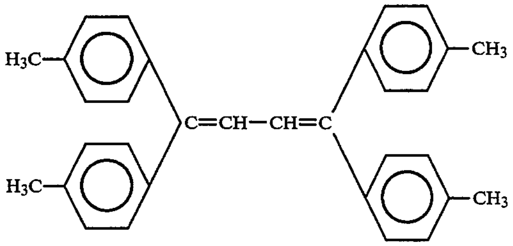
(16)
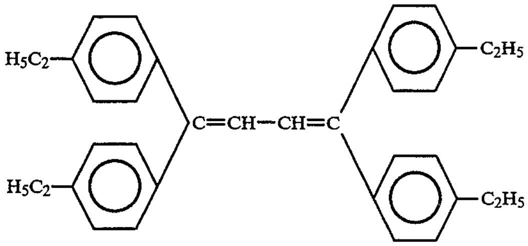
and
(16a)
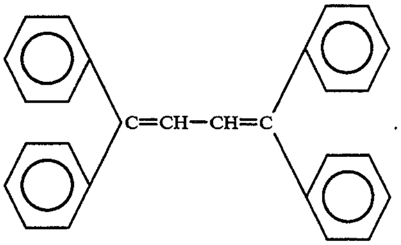
* * * * *